UNITED STATES PATENT OFFICE.

OTTO SCHMIDT, OF LUDWIGSHAFEN-ON-THE-RHINE, AND HUGO BLANKENHORN, OF MANNHEIM, GERMANY, ASSIGNORS TO BADISCHE ANILIN & SODA FABRIK, OF LUDWIGSHAFEN-ON-THE-RHINE, GERMANY, A CORPORATION.

EFFECTING CATALYTIC HYDROGENIZATIONS.

1,237,828.   Specification of Letters Patent.   Patented Aug. 21, 1917.

No Drawing.   Application filed May 8, 1915.   Serial No. 26,846.

*To all whom it may concern:*

Be it known that we, OTTO SCHMIDT and HUGO BLANKENHORN, citizens of the German Empire, residing, respectively, at Ludwigshafen-on-the-Rhine and Mannheim, Germany, have invented new and useful Improvements in Effecting Catalytic Hydrogenizations, of which the following is a specification.

It is known to effect catalytic hydrogenizations by means of hydrogen or gases containing free hydrogen. According to the present invention the catalytic hydrogenizations can be performed by employing as reducing gas carbon monoxid in the presence of water vapor. The latter may be added to pure carbon monoxid or to gases containing it and the quantity of the water vapor should be at least one volume for each three volumes of the carbon monoxid. Gases containing carbon monoxid and hydrogen, such as water gas, or Dowson gas, may also be used in the presence of water vapor, the reducing action of the hydrogen being increased by the simultaneous action of carbon monoxid and water vapor. The present invention renders it possible to substitute for hydrogen the cheap carbon monoxid or the still cheaper mixtures containing it.

Hydrogenizations of the most various kinds can be carried out according to the present process and the reaction takes place already at comparatively low temperatures.

In order to illustrate the new process more fully the following example is given, but the invention is not confined to this example. The parts are by weight.

Example: If it is desired to transform nitrobenzene into anilin a vertical cylinder is supplied with a contact mass containing copper, such as it is obtainable by coating 130 parts of pumice stone with a mixture of 24.3 parts of cupric carbonate, 2.7 parts of zinc carbonate and 20 parts of a concentrated sodium silicate solution and reducing at a low temperature; through this cylinder is passed a mixture of vaporized nitrobenzene and an excess of a reducing gas, containing carbon monoxid and water vapor in such a proportion that at least one volume of water vapor is present for each three volumes of carbon monoxid, and a temperature of from 200 to 220° C. is maintained during the reaction. Anilin is produced with good yields.

In a corresponding manner other hydrogenization processes can be carried out and instead of the described contact mass any other suitable contact mass can be used.

We claim:—

1. The process of effecting catalytic hydrogenizations consisting in treating the substance to be hydrogenated, in the presence of a contact mass, with a gas mixture containing carbon monoxid and at least one volume, of water vapor, for each three volumes of the carbon monoxid.

2. The process of effecting catalytic hydrogenizations consisting in treating the substance to be hydrogenated, in the presence of a contact mass, with a mixture of water gas and at least one volume, of water vapor, for each three volumes of the carbon monoxid.

3. The process of producing aromatic amins by catalytically hydrogenating aromatic nitro compounds consisting in treating an aromatic nitro compound in the presence of a contact mass, with a gas mixture containing carbon monoxid and at least one volume, of water vapor, for each three volumes of the carbon monoxid.

4. The process of producing anilin by catalytically hydrogenating nitrobenzene consisting in treating nitrobenzene, in the vaporized condition in the presence of a contact mass, with a gas mixture containing carbon monoxid and at least one volume, of water vapor, for each three volumes of the carbon monoxid.

In testimony whereof we have hereunto set our hands in the presence of two subscribing witnesses.

OTTO SCHMIDT.

Witnesses:
 PAUL BELTZUND,
 EMILE HOCHY.

HUGO BLANKENHORN.

Witnesses:
 OTTO WOLFF,
 WILLI BAUST.